United States Patent
Jang et al.

(10) Patent No.: US 11,465,406 B2
(45) Date of Patent: Oct. 11, 2022

(54) METHOD OF TRANSFERRING FILM

(71) Applicant: KOREA INSTITUTE OF MACHINERY & MATERIALS, Daejeon (KR)

(72) Inventors: Bongkyun Jang, Daejeon (KR); Jae-Hyun Kim, Daejeon (KR); Hyun-Sung Park, Daejeon (KR); Seung-Mo Lee, Daejeon (KR); Kwangseop Kim, Daejeon (KR); Byung-iK Choi, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 17/289,324

(22) PCT Filed: Oct. 28, 2019

(86) PCT No.: PCT/KR2019/014267
§ 371 (c)(1),
(2) Date: Apr. 28, 2021

(87) PCT Pub. No.: WO2020/091339
PCT Pub. Date: May 7, 2020

(65) Prior Publication Data
US 2022/0009221 A1 Jan. 13, 2022

(30) Foreign Application Priority Data
Oct. 29, 2018 (KR) .................. 10-2018-0130136

(51) Int. Cl.
*B32B 43/00* (2006.01)
*B41F 16/00* (2006.01)
*B65H 29/56* (2006.01)

(52) U.S. Cl.
CPC ........... *B41F 16/002* (2013.01); *B65H 29/56* (2013.01); *B32B 43/006* (2013.01);
(Continued)

(58) Field of Classification Search
CPC . B32B 38/10; B32B 43/006; Y10T 156/1174; Y10T 156/195
See application file for complete search history.

(56) References Cited

U.S. PATENT DOCUMENTS 4,282,056 A * 8/1981 Okui .................... B26D 7/1827
118/37
5,466,325 A * 11/1995 Mizuno ............... B29C 63/0013
156/234

(Continued)

FOREIGN PATENT DOCUMENTS

JP   05-016374   1/1993
JP   05-042692   2/1993
(Continued)

OTHER PUBLICATIONS

Specification translation KR 101104923 (Year: 2012).*

*Primary Examiner* — Philip C Tucker
*Assistant Examiner* — Nickolas R Harm
(74) *Attorney, Agent, or Firm* — Lex IP Meister, PLLC

(57) ABSTRACT

A film transferring method according to an embodiment of the present invention of transferring a film adhered to a substrate to a roller in a state that a first adhesion force between the roller and the film and a second adhesion force between the film and the substrate are substantially the same includes: a transporting step of transporting the substrate and the film of which a first adhesion surface formed on one surface is adhered to the substrate in a first direction; a close contacting step of closely contacting the front end of the second adhesion surface formed on the other surface of the film that is transported with the roller rotating in the first (Continued)

rotation direction; and a transferring step of peeling the film from the substrate and simultaneously transferring it to the roller by peeling the front adhesion surface of the first adhesion surface from the substrate, while simultaneously transferring the front end of the second adhesion surface to the roller and continuously transporting the substrate in the first direction, wherein a first weak adhesion force that is smaller than the second adhesion force is formed between the front adhesion surface and the substrate.

4 Claims, 13 Drawing Sheets

(52) U.S. Cl.
CPC ............... *B65H 2301/51122* (2013.01); *B65H 2701/1752* (2013.01); *Y10T 156/1174* (2015.01); *Y10T 156/195* (2015.01)

(56) References Cited

U.S. PATENT DOCUMENTS

| | | | | |
|---|---|---|---|---|
| 5,540,809 | A * | 7/1996 | Ida | B29C 63/0013 156/715 |
| 6,786,266 | B2 * | 9/2004 | Fukada | B65H 23/32 156/248 |
| 6,843,297 | B2 * | 1/2005 | McKay | B41J 11/46 156/540 |
| 8,123,896 | B2 * | 2/2012 | Watanabe | G06K 19/07718 156/300 |
| 9,751,293 | B2 * | 9/2017 | Huang | B32B 43/006 |
| 2003/0007811 | A1 * | 1/2003 | Ishii | G03G 15/1605 399/308 |
| 2003/0037877 | A1 * | 2/2003 | Brinkmann | B08B 7/0028 156/701 |
| 2004/0033651 | A1 * | 2/2004 | Schermer | B29C 63/0013 438/202 |
| 2008/0113486 | A1 * | 5/2008 | Eguchi | H01L 33/005 438/458 |
| 2008/0216955 | A1 * | 9/2008 | Neeper | B29C 63/0013 156/714 |
| 2009/0288760 | A1 * | 11/2009 | Garben | B32B 43/006 156/230 |
| 2012/0118506 | A1 * | 5/2012 | Kim | H01L 24/83 156/367 |
| 2014/0335310 | A1 * | 11/2014 | Matsumoto | B29C 48/0011 428/141 |
| 2015/0165477 | A1 * | 6/2015 | Yamazaki | B05D 3/12 427/535 |
| 2017/0212284 | A1 | 7/2017 | Wang et al. | |

FOREIGN PATENT DOCUMENTS

| | | |
|---|---|---|
| JP | 10-203020 | 8/1998 |
| KR | 1020090079915 | 7/2009 |
| KR | 10-1104923 | 1/2012 |
| KR | 1020140114147 | 9/2014 |

* cited by examiner (a)

(b)

(c)

METHOD OF TRANSFERRING FILM

TECHNICAL FIELD

The present invention relates to a film transferring method. More particularly, the present invention relates to a film transferring method capable of precise transferring control even when a difference in adhesion between components used in a transferring process is insignificant.

BACKGROUND ART

In various fields, a process of adhering a film is being applied, and a technology for attaching the film to a target part is also diversifying.

The technology of adhering the film may be used, for example, when adhering the film to the surface of various household electronic devices such as washing machines and refrigerators or communication devices such as smart phones.

As the technology for adhering the film, various technologies such as a technology using a stamp are known, and this technology is also used as a technology to adhere a film of a particularly large area. In order to adhere the film to a part to be a target, an adhesion force between a stamp carrying the film and the film and the adhesion force between the targeted part and the film should be considered.

FIG. 1 and FIG. 2 are diagrams for explaining an example of conventional film transferring.

First, as shown in (a) and (b) of FIG. 1, for a picking operation adhering a film 20 adhered to a source substrate 10 to a stamp 30, and, as shown in (c) and (d) of FIG. 1, a placing operation transferring the film 20 adhered to the stamp 30 to a targeted substrate 40, the adhesion forces between the source substrate 10, the film 20, the stamp 30, and the targeted substrate 40 should be considered.

That is, in order to adhere the film 20 of the source substrate 10 to the stamp 30, the adhesion force between the stamp 30 and the film 20 should be designed to be larger than the adhesion force between the source substrate 10 and the film 20. Further, in order to transfer the film 20 adhered to the stamp 30 to the targeted substrate 40, the adhesion force between the targeted substrate 40 and the film 20 should be designed to be greater than the adhesion force between the stamp 30 and the film 20.

However, if the difference in the adhesion force between the source substrate 10 and the film 20, the adhesion force between the stamp 30 and the film 20, and the adhesion force between the targeted substrate 40 and the film 20 is insignificant, there is a problem that it is difficult to accurately transfer the film 20 of the source substrate 10 to the targeted substrate 40.

Particularly, as shown in (a) and (b) of FIG. 2, for a stacking operation in which a plurality of films 20 should be stacked on the targeted substrate 40, and as shown in (c) and (d) of FIG. 2, for a picking operation in which all a plurality of films 20 stacked on the targeted substrate 40 are adhered to the stamp 30, even the magnitude of each adhesion force between the films 20 should be considered, and if the difference in each adhesion force between the films 20 is insignificant, it may be more difficult to design the transferring process.

DISCLOSURE

Technical Problem

One aspect of the present invention is to provide a film transferring method capable of precise transferring control even when the difference in the adhesion force between the components used in the transferring process is insignificant.

The technical object aimed to be achieved by the present invention is not limited to the foregoing technical object, and other non-mentioned technical objects may be clearly understood by those skilled in the art from the description below.

Technical Solution

A film transferring method of transferring a film adhered to a substrate to a roller in a state that a first adhesion force between the roller and the film and a second adhesion force between the film and the substrate are substantially the same according to an embodiment of the present invention, includes: transporting the substrate and the film of which a first adhesion surface formed on one surface is adhered to the substrate in a first direction; closely contacting a front end of a second adhesion surface formed on the other surface of the film that is transported with the roller rotating in a first rotation direction; and peeling the film from the substrate and simultaneously transferring the film to the roller by peeling the front adhesion surface of the first adhesion surface from the substrate, while simultaneously adhering the front end of the second adhesion surface to the roller and continuously transporting the substrate in the first direction, wherein a first weak adhesion force that is smaller than the second adhesion force is formed between the front adhesion surface and the substrate.

A film transferring method of transferring a film adhered to a roller to a substrate in a state in which a first adhesion force between the roller and the film and a second adhesion force between the film and the substrate are substantially the same according to an embodiment of the present invention, includes: rotating the roller and the film of which a first adhesion surface formed on one surface is adhered to the roller in a first rotation direction; transporting the substrate in the first direction and closely contacting a front end of a second adhesion surface formed on the other surface of the rotated film with the transported substrate; and peeling the film from the roller and simultaneously transferring the film to the substrate by peeling a front adhesion surface of the first adhesion surface from the roller, while simultaneously adhering the front end of the second adhesion surface to the substrate and continuously transporting the substrate in the first direction, wherein a first weak adhesion force that is smaller than the first adhesion force is formed between the front adhesion surface and the roller.

In an embodiment of the present invention, a weak adhesion force layer may be provided on the front adhesion surface to generate the first weak adhesion force.

In an embodiment of the present invention, the first adhesion surface may be formed to be shorter than the second adhesion surface, and the front adhesion surface is formed to be inclined in the second adhesion surface direction.

In an embodiment of the present invention, the front adhesion surface may include protrusions and depressions.

A film transferring method of transferring a film adhered to the substrate to the roller in a state that a first adhesion force between the roller and the film and a second adhesion force between the film and the substrate are substantially the same according to an embodiment of the present invention includes: transporting the substrate and the film of which a first adhesion surface formed on one surface is adhered to the substrate in a first direction; closely contacting a front end of a second adhesion surface formed on the other surface of the transported film with the roller rotating in a first rotation direction; and peeling the film from the substrate and simultaneously transferring the film to the roller by adhering a front adhesion surface of the second adhesion surface to the roller, and simultaneously peeling a front end of the first adhesion surface from the substrate and continuously transporting the substrate in the first direction, wherein a first strong adhesion force that is larger than the first adhesion force is formed between the front adhesion surface and the roller.

A film transferring method of transferring a film adhered to a roller to a substrate in a state that a first adhesion force between the roller and the film and a second adhesion force between the film and the substrate are substantially the same according to an embodiment of the present invention includes: rotating the roller and the film of which a first adhesion surface formed on one surface is adhered to the roller in a first rotation direction; transporting the substrate in a first direction and closely contacting the front end of the second adhesion surface formed on the other surface of the rotated film with the transported substrate; and peeling the film from the roller and simultaneously transferring the film to the substrate by adhering a front adhesion surface of the second adhesion surface to the substrate, while simultaneously peeling a front end of the first adhesion surface from the roller and continuously transporting the substrate in the first direction, wherein a first strong adhesion force that is larger than the second adhesion force is formed between the front adhesion surface and the substrate.

In an embodiment of the present invention, a strong adhesion force layer may be formed on the front adhesion surface to generate the first strong adhesion force.

In an embodiment of the present invention, the second adhesion surface may be formed to have a first surface roughness, and the front adhesion surface may be formed to have a second surface roughness that is smaller than that of the first surface roughness.

Advantageous Effects

According to an embodiment of the present invention, by providing the front adhesion surface having the strong adhesion force or the weak adhesion force that is larger or smaller than the adhesion force of the adhesion surface of the film on the front end of the adhesion surface of the film, the film adhered to the substrate may be transferred to the roller or the film adhered to the roller may be transferred to the substrate along the transporting direction of the substrate and the rotation direction of the roller. Through this method, precise transfer control is possible even when the adhesion force between the roller and the film and the adhesion force between the film and the substrate are substantially the same.

The effects of the present invention are not limited to the foregoing effects, and it shall be understood that the effect of the present invention includes all of the effects inferable from the detailed description of the present invention or the configuration of the invention described in the claims.

MODE FOR INVENTION

Figure 1:
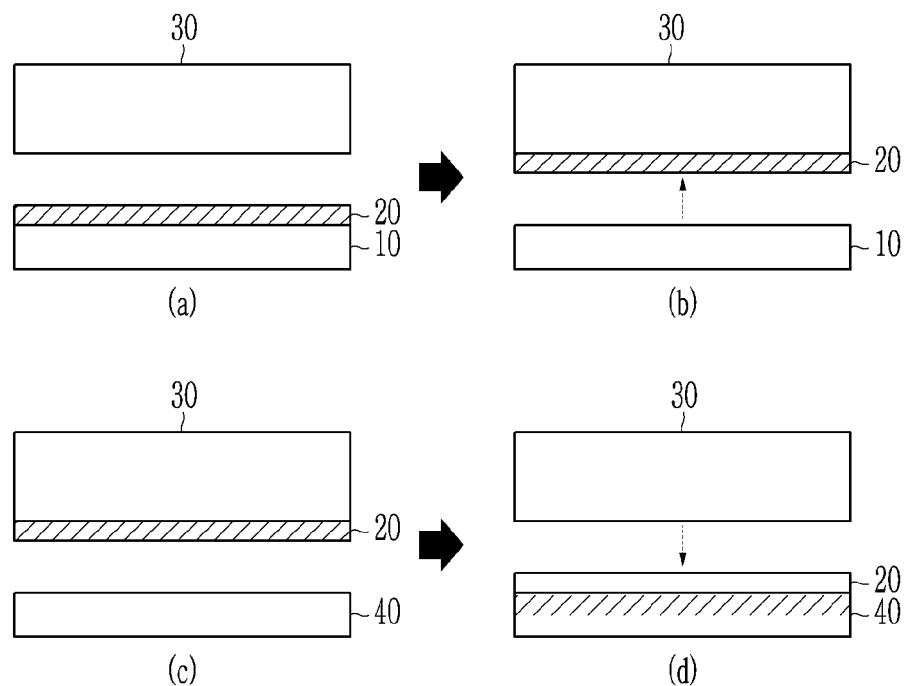
FIG. 1 and FIG. 2 are diagrams for explaining an example of conventional film transferring.
Figure 2:
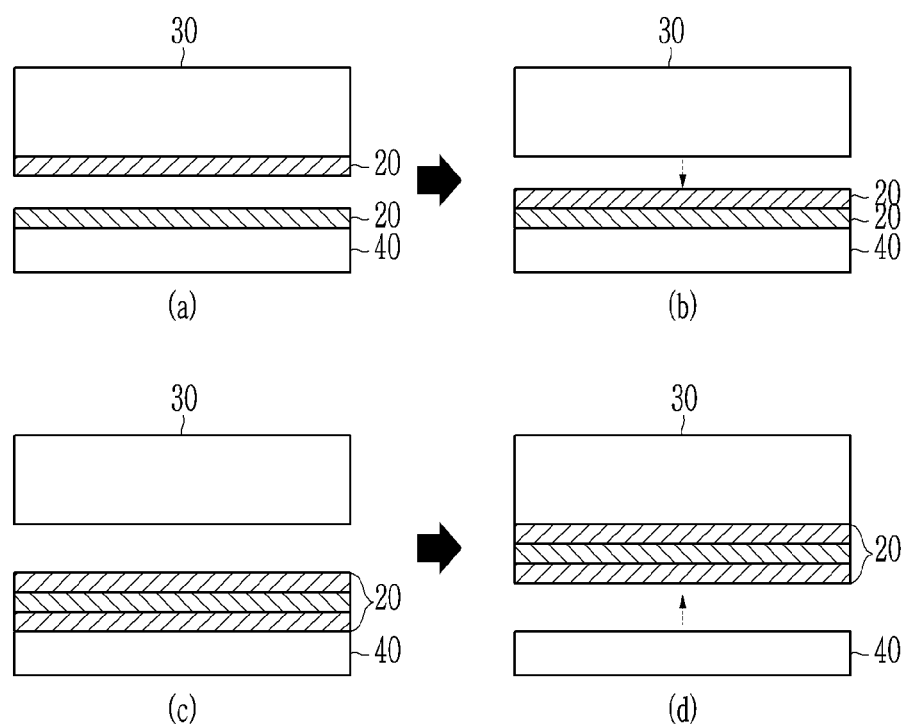

Hereinafter, the present invention will be described with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, when it is described that a part is "connected (in contact with, coupled)" to another part, the part may be "directly connected" to the other element or "connected" to the other part through a third part. Unless explicitly described to the contrary, the word "comprise" and variations such as "comprises" or "comprising" will be understood to imply the inclusion of stated elements but not the exclusion of any other elements.

Further, terms used in the present specification are used for simply explaining a specific embodiment, and are not intended to limit the present invention. A singular expression includes a plural expression unless it is specifically described to the contrary in the context. It will be appreciated that terms "including" and "having" are intended to designate the existence of characteristics, numbers, steps, operations, constituent elements, and components described in the specification, or a combination thereof, and do not exclude a possibility of the existence or addition of one or more other characteristics, numbers, steps, operations, constituent elements, components, or a combination thereof in advance.

Hereinafter, embodiments of the present invention will be described in detail with reference to the accompanying drawings.

Figure 3:
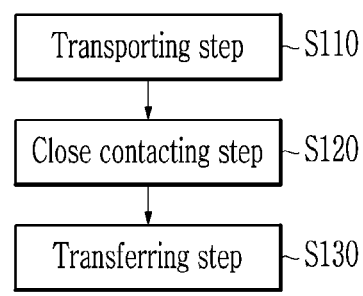
FIG. 3 is a flowchart showing a film transferring method according to a first embodiment of the present invention.
Figure 4:
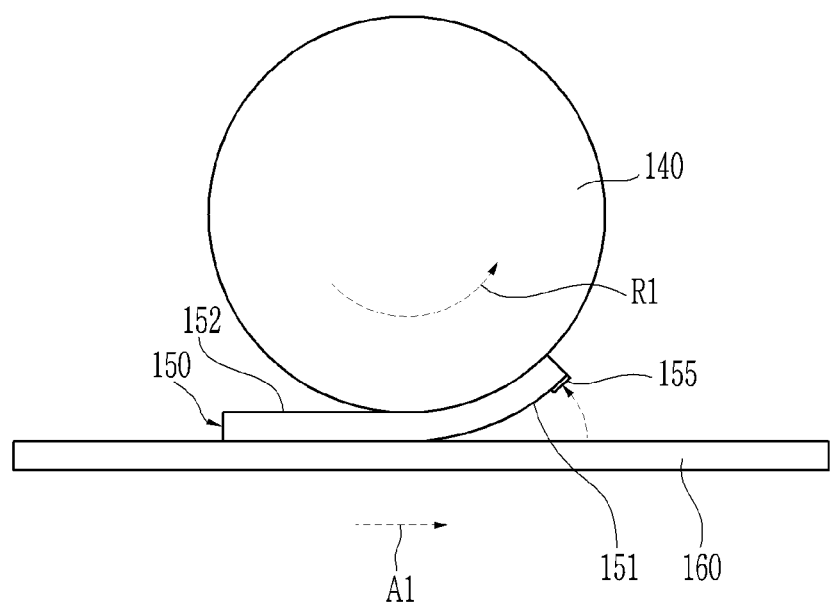
FIG. 4 is a diagram for explaining a film transferring process according to a first embodiment of the present invention.

FIG. 3 is a flowchart showing a film transferring method according to a first embodiment of the present invention, and FIG. 4 is a diagram for explaining a film transferring process according to a first embodiment of the present invention. In the present embodiment, a case of transferring a film adhered to a substrate by a roller is described.

As shown in FIG. 3 and FIG. 4, the film transferring method may include a transporting step (S110), a close contacting step (S120), and a transferring step (S130).

First, in the film transferring method according to the present invention, the first adhesion force between the roller 140 and the film 150 and the second adhesion force between the film 150 and the substrate 160 may be substantially the same.

Also, the film 150 may include a first adhesion surface 151 on one surface and a second adhesion surface 152 on the other surface. That is, the first adhesion surface 151 may be formed on one surface of the film 150, and the second adhesion surface 152 may be formed on the other surface of the film 150.

Hereinafter, for convenience of description, the front end/the front part and the rear end/the rear part are described based on the transporting direction of the film 150. That is, when the film 150 is moved from the first point to the second point, the first point is described as the rear end/the rear part and the second point as the front end/the front part.

The transporting step S110 may be a step of transporting the substrate 160 and the film 150 of which the first adhesion surface 151 is adhered to the substrate 160 in the first direction A1. Since the film 150 is in a state in which the first adhesion surface 151 is adhered to the substrate 160, it may be moved together with the substrate 160 in the first direction A1.

Also, the front adhesion surface 155 may be formed at the front end of the first adhesion surface 151. The first adhesion surface 151 may have the second adhesion force with the substrate 160, while the front adhesion surface 155 may have a first weak adhesion force that is less than the second adhesion force with the substrate 160.

The close contacting step S120 may be a step of bringing the front end of the second adhesion surface 152 of the transported film 150 to be in close contact with the roller 140 rotating in the first rotation direction R1.

Referring to FIG. 4, the roller 140 may be provided on the upper side of the film 150, and the lower end of the roller 140 may be positioned so as to be spaced apart from the upper surface of the substrate 160 by a height corresponding to the thickness of the film 150.

Also, when the roller 140 rotates in the first rotation direction R1, the vertical lower end of the roller 140 may move in the first direction A1.

Therefore, when the film 150 transported together with the substrate 160 is positioned vertically to the lower side of the center of the roller 140, the film 150 may be in close contact with the roller 140 from the front end of the second adhesion surface 152.

The transferring step S130 may be a step of peeling the front adhesion surface 155 of the first adhesion surface 151 from the substrate 160 while simultaneously adhering the front end of the second adhesion surface 152 to the roller 140 and continuously transporting the substrate 160 in the first direction A1, thereby peeling the film 150 from the substrate 160 and transferring the film 150 to the roller 140.

In the transferring step S130, at the point that the film 150 to be transported is positioned vertically below the center of the roller 140 and the front end of the second adhesion surface 152 of the film 150 is in close contact with the roller 140, the first adhesion force occurs between the roller 140 and the second adhesion surface 152. On the other hand, a first weak adhesion force that is less than the second adhesion force occurs between the front adhesion surface 155 and the substrate 160. Here, since the second adhesion force is substantially the same as the first adhesion force, the adhesion force between the roller 140 and the second adhesion surface 152 becomes larger than the adhesion force between the front adhesion surface 155 and the substrate 160, so that the front adhesion surface 155 may be peeled off from the substrate 160.

Also, once the front adhesion surface 155 is peeled from the substrate 160, as the substrate 160 continues to move in the first direction A1, the first adhesion surface 151 that was adhered to the substrate 160 is peeled off from the substrate 160 later and simultaneously the second adhesion surface 152 of the film 150 may be adhered to the roller 140. Thus, the film 150 may be separated from the substrate 160 and transferred to the roller 140 at the same time.

The front adhesion surface 155 may be implemented in various forms to have the adhesion force that is smaller than the adhesion force of the first adhesion surface 151.

Figure 5:
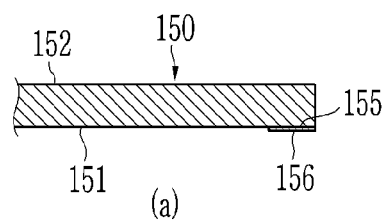
FIG. 5 is a diagram for explaining a film used in a film transferring method according to a first embodiment of the present invention.
Figure 5:
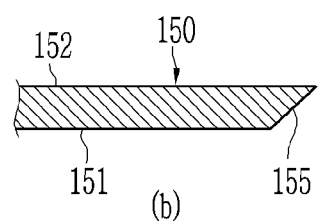
Figure 5:
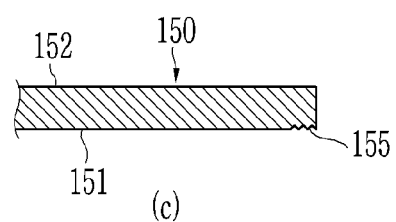

FIG. 5 is an diagram for explaining the film used in the film transferring method according to the first embodiment of the present invention, and first, as shown in (a) of FIG. 5, a weak adhesion force layer 156 may be provided on the front adhesion surface 155 of the film 150 to generate the first weak adhesion force.

The weak adhesion force layer 156 may be formed of a material that causes the adhesion force to be smaller than the second adhesion force. For example, the film 150 may be formed of a polymer material, and the weak adhesion force layer 156 may be formed of a graphene material. When the weak adhesion force layer 156 of the graphene material is provided at the front end of the film 150 and implemented as the weak adhesion force layer 156, the adhesion force with the substrate 160 may be reduced.

The weak adhesion force layer 156 may be prepared by at least any one of a coating, an application, an adhesive, and a deposition.

In another example, as shown in (b) of FIG. 5, the first adhesion surface 151 may be formed to be shorter than the second adhesion surface 152, and thus, the front adhesion surface 155 may be formed to be inclined in the direction of the second adhesion surface 152. In this way, if the thickness of the front end of the film 150 is reduced, the adhesion force may be reduced.

In another example, as shown in (c) of FIG. 5, the front adhesion surface 155 may be formed of protrusions and depressions. When the front adhesion surface 155 is formed of the protrusions and depressions, the contact area may be reduced, and the adhesion force of the front adhesion surface 155 may be reduced.

Figure 6:
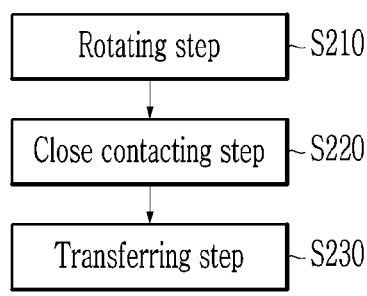
FIG. 6 is a flowchart showing a film transferring method according to a second embodiment of the present invention.
Figure 7:
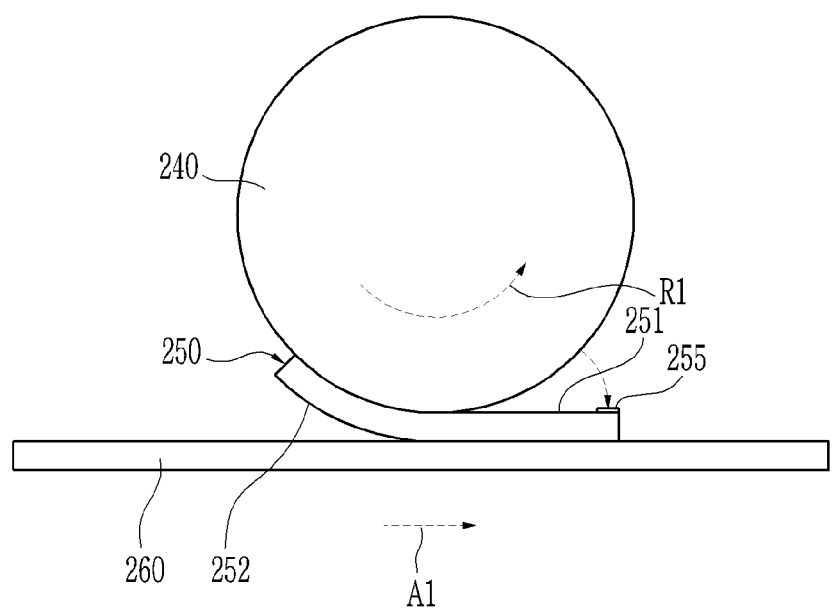
FIG. 7 is a diagram for explaining a film transferring process according to a second embodiment of the present invention.

FIG. 6 is a flowchart showing a film transferring method according to a second embodiment of the present invention, and FIG. 7 is a diagram for explaining a film transferring process according to a second embodiment of the present invention. In the present embodiment, a case of transferring the film adhered to the roller to the substrate is described, and the descriptions of the same contents as in the first embodiment as above-described are omitted as much as possible.

As shown in FIG. 6 and FIG. 7, the film transferring method according to the present embodiment is the film transferring method of transferring the film 250 adhered to the roller 240 to the substrate 260 in the state that the first adhesion force between the roller 240 and the film 250 is substantially the same as the second adhesion force between the film 250 and the substrate 260, and includes a rotating step (S210), a close contacting step (S220), and a transferring step (S230).

The rotating step S210 may be a step of rotating the roller 240 and the film 250 having the first adhesion surface 251 adhered to the roller 240 in the first rotation direction R1.

The close contacting step S220 may be a step in which the front end of the second adhesion surface 252 of the film 250, which is rotated by transporting the substrate 260 in the first direction A1, is in close contact with the transported substrate 260.

The transferring step S230 may be a step of simultaneously peeling the front adhesion surface 255 of the first adhesion surface 251 from the roller 240 and adhering the front end of the second adhesion surface 152 to the substrate 260 and continuously transporting the substrate 160 in the first direction A1, thereby peeling the film 250 from the roller 240 and transferring the film 150 to the substrate 260.

In the present embodiment, a first weak adhesion force that is less than the first adhesion force may be formed between the front adhesion surface 255 and the roller 240 of the first adhesion surface 251.

Accordingly, in the transferring step S230, if the front end of the rotating film 250 is disposed vertically below the center of the roller 240 and in close contact with the upper surface of the substrate 260, the second adhesion force between the second adhesion surface 252 of the film 250 and the substrate 260 becomes larger than the first weak adhesion force between the front adhesion surface 255 and the roller 240, and resultantly the front adhesion surface 255 may be peeled from the roller 240.

Also, if once the front adhesion surface 255 is peeled from the roller 240, as the substrate 260 continues to move in the first direction A1, the first adhesion surface 251 that was adhered to the roller 240 is peeled off from the roller 240 and the second adhesion surface 252 of the film 250 may be adhered to the substrate 260. Thus, resultantly, the film 250 may be separated from the roller 240 and transferred to the substrate 260 at the same time.

In the present embodiment, the front adhesion surface 255 of the first adhesion surface 251 may be applied with all forms described in the first embodiment with reference to FIG. 5.

Figure 8:
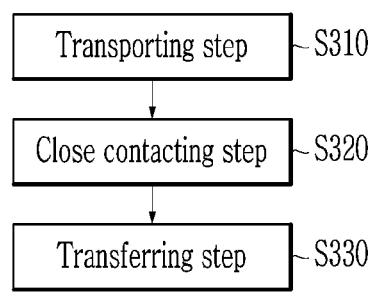
FIG. 8 is a flowchart showing a film transferring method according to a third embodiment of the present invention.
Figure 9:
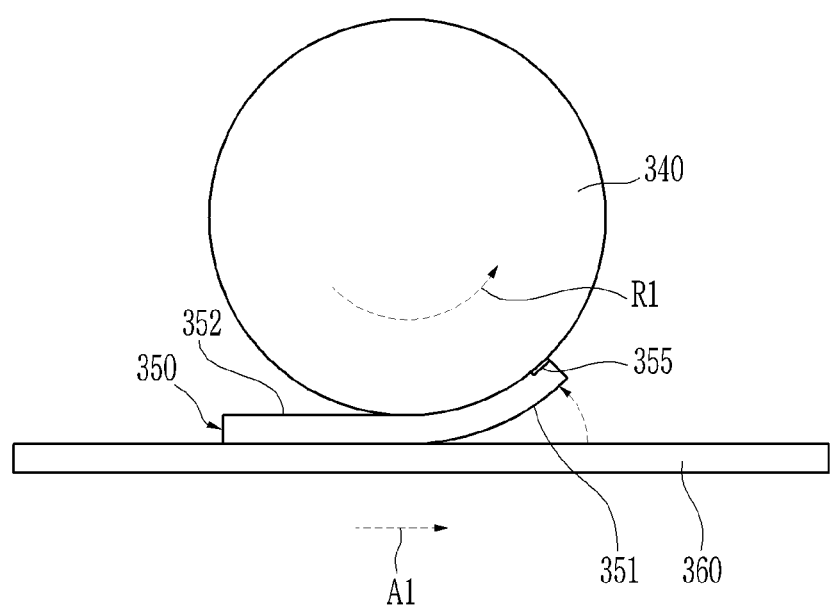
FIG. 9 is a diagram for explaining a film transferring process according to a third embodiment of the present invention.

FIG. 8 is a flowchart showing a film transferring method according to a third embodiment of the present invention, and FIG. 9 is an diagram for explaining a film transferring process according to a third embodiment of the present invention.

As shown in FIG. 8 and FIG. 9, another film transferring method according to the present embodiment is a film transferring method of transferring the film 350 adhered to the substrate 360 to the roller 340 in the state in which the first adhesion force between the roller 340 and the film 350 is substantially the same as the second adhesion force between the film 350 and the substrate 360, and may include the transporting step S310, the close contacting step S320, and the transferring step S330.

The transporting step S310 may be a step of transporting the substrate 360 and the film 350 having the first adhesion surface 351 adhered to the substrate 360 in the first direction A1. Since the film 350 is in a state where the first adhesion surface 351 is adhered to the substrate 360, it may be moved together with the substrate 360 in the first direction A1.

In addition, the front adhesion surface 355 may be formed at the front end of the second adhesion surface 352. The second adhesion surface 352 may have a first adhesion force with the roller 340, while the front adhesion surface 355 may have a first strong adhesion force that is larger than the first adhesion force with the roller 340.

The close contacting step S320 may be a step of rotating the front end of the second adhesion surface 352 of the transported film 350 in the first rotation direction R1 to be in close contact with the roller 340.

If the film 350 transported together with the substrate 360 is positioned vertically below the center of the roller 340, the film 350 may be in close contact with the roller 340 from the front end of the second adhesion surface 352.

The transferring step S330 may be a step of peeling the front adhesion surface 355 of the second adhesion surface 352 to the roller 340 and simultaneously peeling off the front end of the first adhesion surface 351 from the substrate 360 and continuously transporting the substrate 360 in the first direction A1 to peel the film 350 from the substrate 360 to be transferred to the roller 340.

In the transferring step S330, if the transported film 350 is positioned vertically below the center of the roller 340 and the front adhesion surface 355 of the second adhesion surface 352 of the film 350 is in close contact with the roller 340, the first strong adhesion force that is larger than the first adhesion force occurs between the roller 340 and the front adhesion surface 355. On the other hand, since the second adhesion force between the first adhesion surface 351 and the substrate 360 is less than the first strong adhesion force, the front end of the first adhesion surface 351 may eventually peel off from the substrate 360.

Also, if once the front end of the first adhesion surface 351 is peeled from the substrate 360, as the substrate 360 continues to move in the first direction A1, the first adhesion surface 351 that was adhered to the substrate 360 is then peeled off from the substrate 360, and the second adhesion surface 352 of the film 350 may be adhered to the roller 340. Thus, resultantly, the film 350 may be separated from the substrate 360 and transferred to the roller 340 at the same time.

The front adhesion surface 355 may be implemented in various forms to have the adhesion force that is greater than the adhesion force of the second adhesion surface 352.

Figure 10:
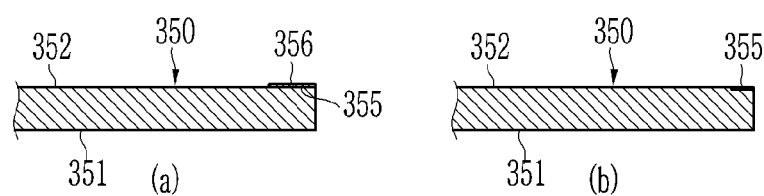
FIG. 10 is a diagram for explaining a film used in a transferring method according to a third embodiment of the present invention.

FIG. 10 is a diagram for explaining a film used in a transferring method according to a third embodiment of the present invention, and as shown in (a) of FIG. 10, the strong adhesion force layer 356 to generate the first strong adhesion force may be provided on the front adhesion surface 355 of the film 350.

The strong adhesion force layer 356 may be made of a thin film of a ferromagnetic material, and the ferromagnetic material may include, for example, nickel (Ni), iron (Fe), cobalt (Co), or the like. If the strong adhesion force layer 356 of the ferromagnetic material is provided, the adhesion force may be increased.

In addition, when the film 350 is formed of a polymer material, the strong adhesion force layer 356 may be formed of a material that generates an electrostatic force. By making the strong adhesion force layer 356 generate a strong electrostatic force, the strong adhesion force may be realized.

The strong adhesion force layer 356 may be prepared by at least any one method of coating, application, adhesion, and deposition.

In another example, as shown in (b) of FIG. 10, the second adhesion surface 352 may be formed to have a first surface roughness, and the front adhesion surface 355 may be formed to have a second surface roughness that is smaller than the first surface roughness. If the surface roughness of the front adhesion surface 355 is smaller than the overall surface roughness of the second adhesion surface 352, since the adhesion area between the front adhesion surface 355 and the roller 340 may be increased, the adhesion force between the front adhesion surface 355 and the roller 340 may be relatively larger.

Figure 11:
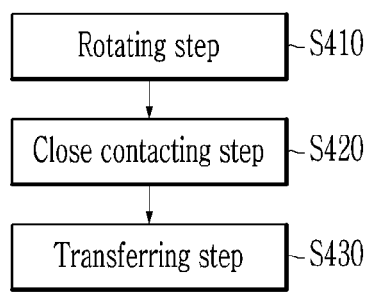
FIG. 11 is a flowchart showing a film transferring method according to a fourth embodiment of the present invention.
Figure 12:
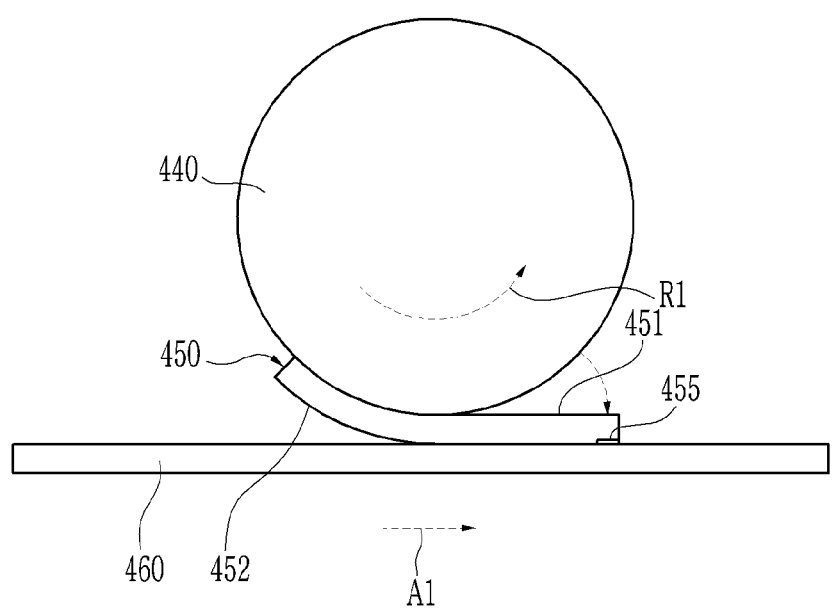
FIG. 12 is a diagram for explaining a film transferring process according to a forth embodiment of the present invention.

FIG. 11 is a flowchart showing a film transferring method according to a fourth embodiment of the present invention, and FIG. 12 is a diagram for explaining a film transferring process according to a forth embodiment of the present invention. In the present embodiment, a case of transferring the film adhered to the roller to the substrate is described, and the description of the same contents as those of the third embodiment is omitted as much as possible.

As shown in FIG. 11 and FIG. 12, the film transferring method according to the present embodiment, in the state that the first adhesion force between the roller 440 and the film 450 and the second adhesion force between the film 450 and the substrate 460 are substantially the same, may include a rotating step (S410), a close contacting step (S420), and a transferring step (S430) as a film transferring method of transferring the film 450 adhered to the roller 440 to the substrate 460.

The rotating step (S410) may be a step of rotating the roller 440 and the film 450 having the first adhesion surface 451 adhered to the roller 440 in the first rotation direction R1.

The close contacting step S420 may be a step of contacting the front end of the second adhesion surface 452 of the rotated film 450 to the transported substrate 460 by transporting the substrate 460 in the first direction A1.

The transferring step S430 may be a step of peeling the film 450 from roller 440 to be transferred to the substrate 460 by adhering the front adhesion surface 455 of the second adhesion surface 452 to the substrate 460, while simultaneously peeling the front end of the first adhesion surface 451 from the roller 440 and continuously transporting the substrate 460 in the first direction A1.

In the present embodiment, the first strong adhesion force that is larger than the second adhesion force may be formed between the front adhesion surface 455 of the second adhesion surface 452 and the substrate 460.

Accordingly, in the transferring step S430, if the front end of the rotated film 450 is disposed vertically below the center of the roller 440 and is contacted with the upper surface of the substrate 460, since the first strong adhesion force that is larger than the first adhesion force between the first adhesion surface 451 and the roller 440 is generated between the front adhesion surface 455 and the substrate 460, the first adhesion surface 451 may be peeled from the roller 440.

Also, once the front end of the first adhesion surface 451 is peeled from the roller 440, as the substrate 460 continues to move in the first direction A1, all of the first adhesion surface 451 that was adhered to the roller 440 is peeled off from the roller 440, at the same time, the second adhesion surface 452 of the film 450 may be adhered to the substrate 460. Thus, consequently, the film 450 may be separated from the roller 440 and transferred to the substrate 460 at the same time.

In the present embodiment, the front adhesion surface 455 of the second adhesion surface 452 may be applied as described in the third embodiment with reference to FIG. 10.

On the other hand, the previous explanation is based on the fact that the front adhesion surface is provided on one end of the film, but the front adhesion surface may be provided on both surfaces or both ends of the film, and each front adhesion surface may be formed so that the strong adhesion force or the weak adhesion force is mixed.

Figure 13:
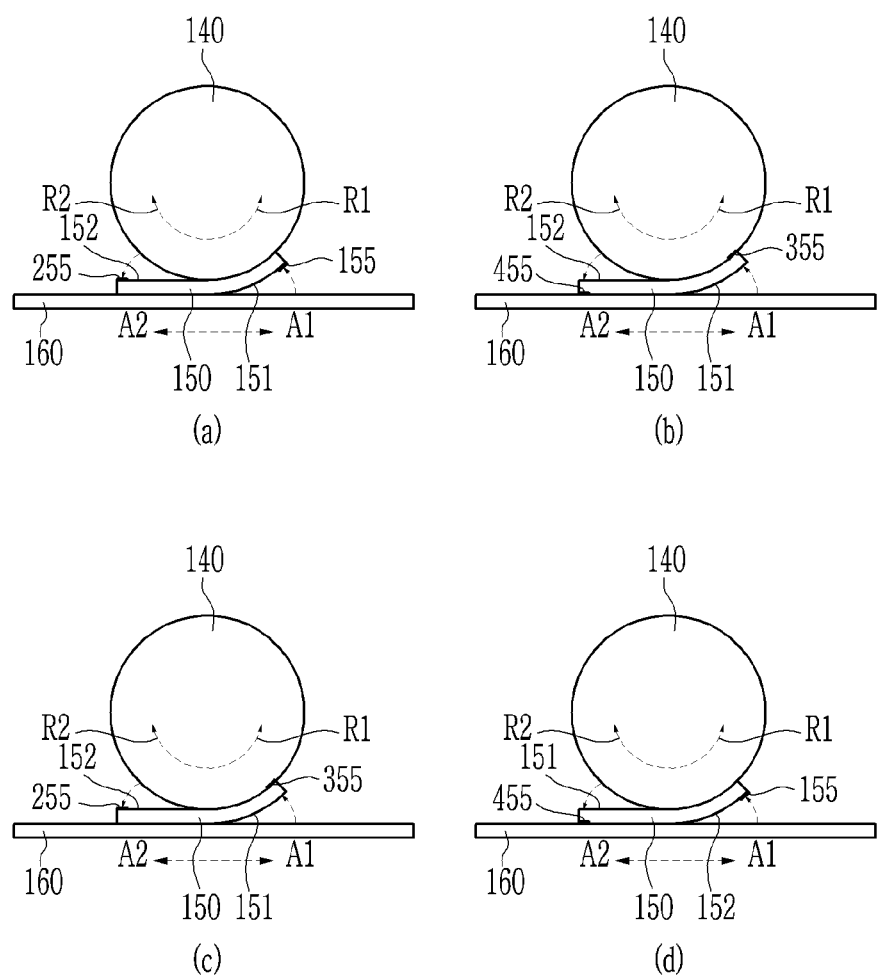
FIG. 13 is a diagram for explaining a mixture application example of a film transferring process according to an embodiment of the present invention.

FIG. 13 is a diagram for explaining a mixture application example of a film transferring process according to an embodiment of the present invention.

First, as shown in (a) of FIG. 13, a front adhesion surface 155 having the weak adhesion force that is smaller than the adhesion force between the first adhesion surface 151 and the substrate 160 may be provided on the front end of the first direction A1 of the first adhesion surface 151 of the film 150 adhered to the substrate 160. Also, a front adhesion surface 255 having the weak adhesion force that is smaller than the adhesion force between the second adhesion surface 152 and the roller 140 may be provided on the front end of the second direction A2 of the second adhesion surface 152 of the film 150 adhered to the roller 140. Thus, the film 150 adhered to the substrate 160 may be transferred to the roller 140 or the film 150 adhered to the roller 140 may be transferred to the substrate 160 along the transporting direction of the substrate 160 and the rotation direction (i.e., a first rotation direction R1 and a second rotation direction R2) of the roller 140.

Also, as shown in (b) of FIG. 13, a front adhesion surface 455 having the strong adhesion force that is larger than the adhesion force of the first adhesion surface 151 may be provided on the front end of the second direction A2 of the first adhesion surface 151 of the film 150 adhered to the substrate 160, and a front adhesion surface 355 having the strong adhesion force that is larger than the adhesion force of the second adhesion surface 152 may be provided on the front end of the first direction A1 of the second adhesion surface 152 of the film 150 adhered to the roller 140. Thus, the film 150 adhered to the substrate 160 may be transferred to the roller 140 or the film 150 adhered to the roller 140 may be transferred to the substrate 160 along the transporting direction of the substrate 160 and the rotation direction of the roller 140.

Also, as shown in (c) of FIG. 13, a front adhesion surface 355 having the strong adhesion force that is larger than the adhesion force of the second adhesion surface 152 may be provided on the front end of the first direction A1 of the second adhesion surface 152 of the film 150 that is not adhered to the substrate 160, and a front adhesion surface 255 having the weak adhesion force that is smaller than the adhesion force of the second adhesion surface 152 may be provided on the front end of the second direction A2 of the second adhesion surface 152. Thus, the film 150 adhered to the substrate 160 may be transferred to the roller 140, or the film 150 adhered to the roller 140 may be transferred to the substrate 160 along the transporting direction of the substrate 160 and the rotation direction of the roller 140.

Further, as shown in (d) of FIG. 13, the front adhesion surface 155 having the weak adhesion force that is smaller than the adhesion force of the second adhesion surface 152 may be provided on the front end of the first direction A1 of the second adhesion surface 152 of the film 150 to which the roller 140 is not adhered, and the front adhesion surface 455 having the strong adhesion force that is larger than the adhesion force of the second adhesion surface 152 may be provided on the front end of the second direction A2 of the second adhesion surface 152, and thereby the film 150 adhered to the substrate 160 may be transferred to the roller 140, or the film 150 adhered to the roller 140 may be transferred to the substrate 160 along the transporting direction of the substrate 160 and the rotation direction of the roller 140.

The description of the present invention is merely illustrative, and it will be understood by those skilled in the art that various changes in a specific form and details may be made therein without a change of the technical spirit or essential features of the present invention. Accordingly, it shall be understood that the embodiments described above are illustrative in all aspects, and are not limited. For example, each constituent element described in a singular form may be regarded as in a plural form, and similarly, constituent elements described as being distributed may be fed in a combined form.

The scope of the present invention is represented by the claims, and it shall be construed that all of changes or modified forms derived from the meaning and the scope of the claims and equivalent concepts thereof are included in the scope of the present invention.

DESCRIPTION OF REFERENCE NUMERALS 140, 240, 340, 440: roller
150, 250, 350, 450: film
151, 251, 351, 451: first adhesion surface
152, 252, 352, 452: second adhesion surface
155, 255, 355, 455: front adhesion surface
156: weak adhesion force layer
160, 260, 360, 460: substrate
356: strong adhesion force layer

The invention claimed is:

1. A film transferring method of transferring a film adhered to a substrate to a roller in a state that a first adhesion force between the roller and the film and a second adhesion force between the film and the substrate are substantially the same, comprising:
    transporting the substrate and the film of which a first adhesion surface formed on one surface is adhered to the substrate in a first direction;
    contacting a front end of a second adhesion surface formed on another surface of the film that is transported with the roller rotating in a first rotation direction; and
    peeling the film from the substrate and simultaneously transferring the film to the roller by peeling a front adhesion surface of the first adhesion surface from the substrate, while simultaneously adhering the front end of the second adhesion surface to the roller and continuously transporting the substrate in the first direction,
    wherein a third adhesion force smaller than the second adhesion force is formed between the front adhesion surface and the substrate,
    wherein the third adhesion force is generated by
    providing an adhesion force layer having weaker adhesion force than the second adhesion force on the front adhesion surface or
    forming the first adhesion surface to be shorter than the second adhesion surface and the front adhesion surface to be inclined in the second adhesion surface direction.

2. A film transferring method of transferring a film adhered to a roller to a substrate in a state in which a first adhesion force between the roller and the film and a second adhesion force between the film and the substrate are substantially the same, comprising:
    rotating the roller and the film of which a first adhesion surface formed on one surface is adhered to the roller in a first rotation direction;
    transporting the substrate in a first direction and contacting a front end of a second adhesion surface formed on another surface of the rotated film with the transported substrate; and
    peeling the film from the roller and simultaneously transferring the film to the substrate by peeling a front adhesion surface of the first adhesion surface from the roller, while simultaneously adhering the front end of the second adhesion surface to the substrate and continuously transporting the substrate in the first direction,
    wherein a third adhesion force smaller than the first adhesion force is formed between the front adhesion surface and the roller,
    wherein the third adhesion force is generated by
    providing an adhesion force layer having weaker adhesion force than the second adhesion force on the front adhesion surface or
    forming the first adhesion surface to be shorter than the second adhesion surface and the front adhesion surface to be inclined in the second adhesion surface direction.

3. A film transferring method of transferring a film adhered to a substrate to a roller in a state that a first adhesion force between the roller and the film and a second adhesion force between the film and the substrate are substantially the same, comprising:
    transporting the substrate and the film of which a first adhesion surface formed on one surface is adhered to the substrate in a first direction;
    contacting a front end of a second adhesion surface formed on another surface of the transported film with the roller rotating in a first rotation direction; and
    peeling the film from the substrate and simultaneously transferring the film to the roller by adhering a front adhesion surface of the second adhesion surface to the roller, while simultaneously peeling a front end of the first adhesion surface from the substrate and continuously transporting the substrate in the first direction,
    wherein a third adhesion force larger than the first adhesion force is formed between the front adhesion surface and the roller,
    wherein the third adhesion force is generated by providing an adhesion force layer having stronger adhesion force than the first adhesion force on the front adhesion surface.

4. A film transferring method of transferring a film adhered to a roller to a substrate in a state that a first adhesion force between the roller and the film and a second adhesion force between the film and the substrate are substantially the same, comprising:
    rotating the roller and the film of which a first adhesion surface formed on one surface is adhered to the roller in a first rotation direction;
    transporting the substrate in a first direction and contacting a front end of the second adhesion surface formed on another surface of the rotated film with the transported substrate; and
    peeling the film from the roller and simultaneously transferring the film to the substrate by adhering a front adhesion surface of the second adhesion surface to the substrate, while simultaneously peeling a front end of the first adhesion surface from the roller and continuously transporting the substrate in the first direction,
    wherein a third adhesion force larger than the second adhesion force is formed between the front adhesion surface and the substrate,
    wherein the third adhesion force is generated by providing an adhesion force layer having stronger adhesion force than the second adhesion force on the front adhesion surface.

* * * * *